Dec. 13, 1960

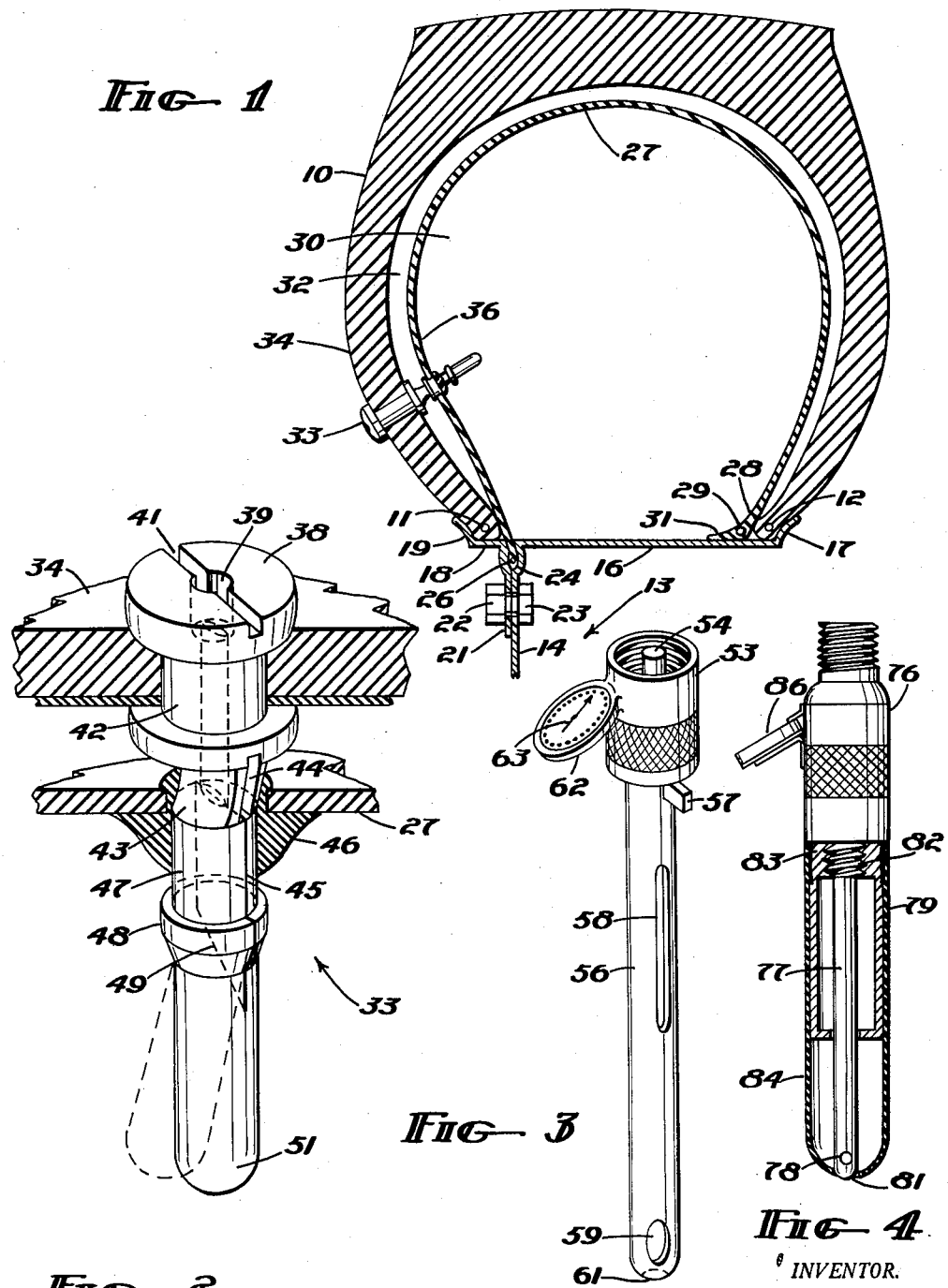

I. TUBBS 2,964,084

MULTIPLE CHAMBER PNEUMATIC TIRE AND
INFLATING MEANS THEREFOR

Filed July 29, 1957

INVENTOR.
IRL TUBBS
BY Marvin Moody
ATTORNEY

United States Patent Office 2,964,084
Patented Dec. 13, 1960

2,964,084
MULTIPLE CHAMBER PNEUMATIC TIRE AND
INFLATING MEANS THEREFOR

Irl Tubbs, Mount Vernon, Iowa

Filed July 29, 1957, Ser. No. 674,644

7 Claims. (Cl. 152—341)

This invention relates in general to a means for inflating a pneumatic tire and in particular to a new valve structure and method of constructing a tire.

It is very desirable for safety purposes to have a tire on an automobile which is not subject to the hazards of blowouts or sudden failure. To overcome this danger recent developments in tires have provided a pair of air chambers with one mounted inside the other so that rupture of the outer casing will not cause the tire to go down completely. Such structures have generally required two valves communicating with the two air chambers. One valve being metallic and passing through the rim of the wheel and the other being a valve in the sidewall of the tire such as described in Tubbs Patent Number 2,634,785.

It is an object of the present invention to provide a double chamber tire which has a single valve mounted in the sidewall of the tire which is capable of inflating both air chambers.

Another object of this invention is to provide an improved inner liner for a tubeless tire which may be mounted to a wheel of an automobile with an improved rim structure.

It is another object of this invention to provide an improved valve structure with which an inflating needle may be used to inflate both chambers of the tire.

Yet another object is to provide a pair of valves in aligned relationship through the sidewall of a tire and an inner liner.

A feature of the invention is found in the provision for a tire with an inner and outer chamber and with a flexible valve structure extending through the sidewall of the tire and inflatable with a needle.

Further objects, features and advantages of this invention will become apparent from the following description and claims when read in view of the drawings, in which:

Figure 1 is a sectional view of a two-chambered tire with the valve in place.

Figure 2 is an enlarged view of the valve.

Figure 3 illustrates a needle for inflating both chambers of the tire.

Figure 4 illustrates a modification of the needle.

Figure 10:
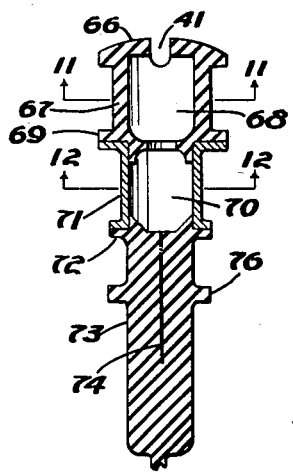
Figure 10 is a sectional view of a modified valve.

Figure 1 illustrates a tire casing 10 which may be of the conventional tubeless type and which has beads 11 and 12 that are receivable in the rim of a wheel. The wheel 13 has a portion 14 that extends toward the center and a flat portion 16 which has a projection 17 against which the bead 12 of the tire rests. An annular rim portion 18 has an extending portion 19 against which the other bead 11 of the tire rests. Rim portion 18 is formed with an annular downwardly extending portion 21 which may be attached to the wheel 14 by suitable fastening means as for example bolts 22 and nuts 23. The nuts 23 are welded to the wheel 13 behind aligned openings.

An annular opening 24 is formed between the portion 21 and the wheel portion 14 for clamping an annular bead 26 of an inner liner 27 mounted within the casing 10. The other end 28 of the inner liner 27 has a second bead 29 of larger diameter than the bead 26 and has a flexible portion 31 which provides an air seal between the inner chamber 30 and the outer chamber 32 between the liner and casing.

A valve insert 33 of this invention extends through the sidewall 34 of the casing 10 and the sidewall 36 of inner liner 27 to inflate the inner chamber 30 within the inner liner and the outer chamber 32 between the inside of the casing and the outside of the inner liner.

Figure 2 illustrates the valve insert 33. It comprises an external disc-shaped portion 38 which is formed with an annular opening 39 and a key-way 41 for a purpose to be later described. A cylindrical portion 42 extends down from the disc portion.

Cylindrical portion 42 extends through the casing of the tire and has a central opening of generally elliptical shape which is held closed by the casing.

A generally conical-shaped member 43 is attached to the cylindrical portion 42 and is formed with a transverse slot 44 which communicates with the elliptical central opening of the valve insert.

A reenforcement 46 of rubber or other substance is an integral part of the inner liner 27 and is formed with an opening through which a lower cylindrical portion 47 of the valve insert extends. An enlarged portion 48 is formed about portion 47.

The lower portion 47 has an internal slit 45 which communicates with the central opening through the valve insert and which is held closed by the inner liner. The internal slit meets a slant cut 49 formed in the lower portion 47 above its end 51.

Figure 6:
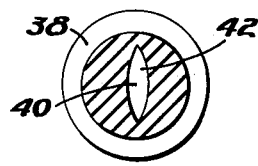
Figure 6 is a sectional view taken on line 6—6 of Figure 5.

Figures 5 through 8 illustrate the valve insert in section. As shown in Figure 6, the central opening 40 is elliptical-shaped within the cylindrical portion 42.

Figure 7:
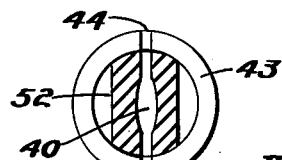
Figure 7 is a sectional view taken on line 7—7 of Figure 5.
Figure 8:
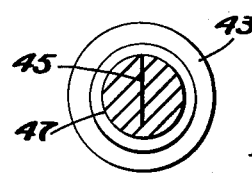
Figure 8 is a sectional view taken on line 8—8 of Figure 5.

Figure 7 shows how the central elliptical opening 40 communicates with the transverse slot 44. This view also shows that the downwardly extending portion 52 of the conical shaped portion 43 is decreased in diameter on two sides so as to increase the flexibility thereof for a purpose to be later described. Figure 8 shows the slit 45 formed through the portion 47 of the valve.

Figure 3 illustrates a needle for inflating the tire through the valve insert of this invention. It comprises a top cylindrical portion 53 which has a valve stem 54 threadedly or otherwise mounted therein.

An inflating shaft 56 is attached to the cylindrical portion 53. A transverse member 57 is attached to the shaft 56 adjacent to the cylinder 53. The shaft 56 is hollow and has a first pair of openings 58 formed in the sidewall thereof and a second pair of openings 59 formed adjacent the end 61. An indicating gauge 62 has an indicating needle 63 which moves in response to pressure within the opening in the shaft 56.

The operation of the embodiments shown in Figures 1, 2, 3, 5, 6, 7 and 8 is as follows. The bolts 22 are removed from the nuts 23 and the rim portion 18 is disconnected from the wheel 13. The bead 12 of the casing 10 is pushed against the projection 17 and the bead 29 of the inner liner 27 is put over the portions 16 and against the beads 12.

The valve insert 33 is inserted through an opening in the casing 10 and through an opening in the liner 27. The bead of smaller diameter 26 of the inner liner 27 is then placed in the annular opening 24. The bead 11 is mounted within the projection 19 of the rim portion and the bolts 22 are replaced and tightened to firmly complete the assembly. Bead 26 forms an air-tight seal.

The inflating needle shown in Figure 3 is inserted into the valve insert with the projection 57 in key-way 41.

The lower end 61 of the needle passes through the central opening of the valve insert and hits the slant portion 49 in the bottom of slot 45 and pushes the lower end 51 of the valve insert sideways so that the lower end 61 and the openings 59 extend into the inner chamber 30 of the liner.

The openings 58 in the shaft 56 align with the transverse opening 44 formed through the conical portion 43 of the valve insert to inflate the outer chamber 32 between the inside of the casing and the outside of the liner.

The openings 59 are larger than the openings 58 so that the inner liner will be inflated to the shape shown in Figure 1. The gauge 62 indicates the pressure within both chambers of the tire. Both chambers of the tire may be inflated with a conventional air hose as found at filling stations and garages.

The sidewall 34 of the casing 10 holds the cylindrical portion 42 of the valve insert to maintain the elliptical opening 40 closed to form an air-tight seal when the inflating needle is removed.

Likewise the inner liner holds the opening through the portion of the valve insert which extends therethrough to form an air-tight seal when the needle is removed.

It is generally desirable to moisten or lubricate the inflating needle before inserting it into the valve insert.

The reduced portion 52 of the conical portion 43 allows flexure between the portions of the valve insert that extend through the casing and the liner. Thus in the event of a blowout in the casing which allows air to escape from the outer chamber 32, the inner chamber will remain inflated and relative motion may occur in the valve insert due to the flexibility in the portion 52.

Figure 11:
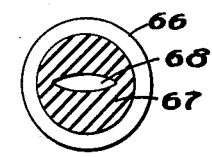
Figure 11 is a sectional view taken on line 11—11 of Figure 10.
Figure 12:
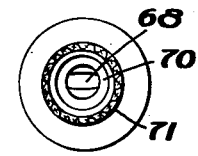
Figure 12 is a sectional view taken on line 12—12 of Figure 10.
Figure 9:
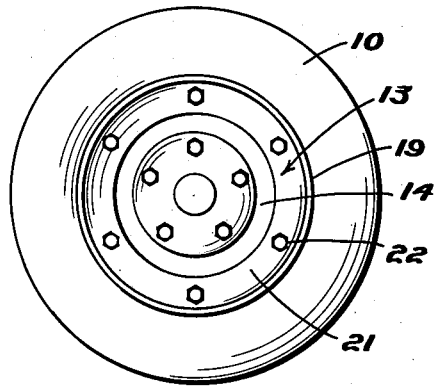
Figure 9 is a view showing the improved rim structure of this invention.
Figure 5:
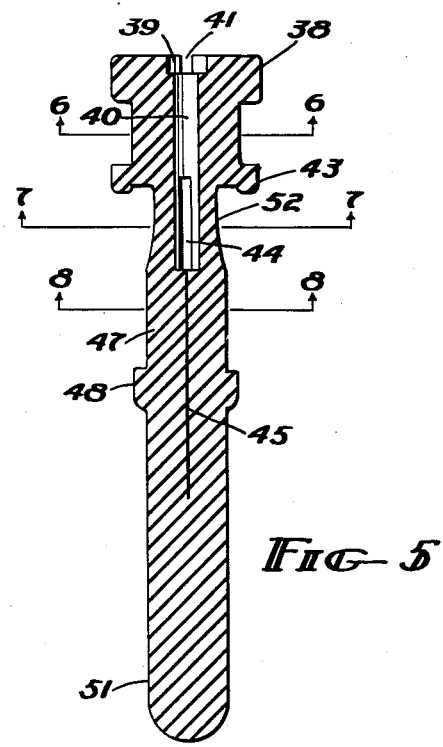
Figure 5 is a sectional view of the valve.

Figure 10 illustrates a modified valve insert wherein a head portion 66 has a downwardly extending portion 67 which is formed with central elliptical opening 68 as best shown in Figure 11. A rim 69 is formed at the lower end of cylindrical portion 67 and a cylinder of flexible pervious webbing material 71 is attached to the rim 69. Air may freely pass through material 71. The lower end of the webbing 71 is attached to a rim 72 of a lower portion 73 which is formed with a central slot 74. A third rim 76 is formed about the portion 73. This modification shown in Figures 10, 11 and 12 which has flexible webbing 71 allows movement between the casing 10 mounted between the rim 69 and the head 66 and the liner mounted between the rims 72 and 76.

A modified inflating needle is shown in Figure 4. This needle allows the two chambers of the tire to be independently inflated and comprises a cylindrical portion 76 which has a downwardly extending inflating shaft 77 with openings 78 formed adjacent its lower end. A flexible cylindrical sleeve 79 has an opening 81 through which the shaft 77 extends. Sleeve 83 acts as a stop to place orifices 78 in place to inflate the outer chamber. Its upper end is attached to a sleeve 83 which mates with a threaded portion 82 on shaft 77. The lower end 84 of sleeve 79 is compressed when the shaft 77 is inserted into a valve insert. A guage 86 indicates the pressure within the shaft 77. Lubricant may be placed within sleeve 83 to lubricate shaft 77 to facilitate insertion into the valve insert.

In use the needle of Figure 4 is attached to an air hose. A conventional valve stem is mounted in the cylindrical member 76. The sleeve 83 is removed and the needle is inserted into the valve insert 33 completely to inflate the inner chamber 30. When this chamber has been sufficiently inflated the needle is removed and the sleeve 83 is reattached to the needle. Then the needle is reinserted in the valve insert to inflate the outer chamber. The lower end 84 of the flexible cover is pushed up on the shaft 77 during this operation. The needle shown in Figure 4 may also be used to check the pressure in both chambers of the tire by inserting it into either the inner or outer chamber.

The key-way indicated that the tire is a double chamber structure according to this invention.

In summary it is seen that this invention provides the following advantages:

(1) A valve with two valve casings and a common valve core.
(2) Both chambers of a tire may be simultaneously inflated.
(3) Both chambers simultaneously inflated with the pressure of the inner chamber maintained ahead of the pressure in the outer chamber.
(4) Equalization of pressure in chambers at the end of inflation.
(5) Indication that equalization has taken place.
(6) Outer end of valve indicates that the tire is a two chambered one.
(7) Split rim, tire and valve assembly in which common gasket seals split in rim and seals the two chambers from each other.
(8) A service instrument that inflates both chambers simultaneously with pressure of the inner maintained ahead of the outer chamber during inflation, equalizes pressures in chambers after inflation and indicates when equalization is completed.
(9) Both chambers are sealed individually when service is completed.

Although this invention has been described with respect to particular modifications it is not to be so limited as changes and modifications which are within the full intended scope of the appended claims are covered.

I claim:

1. A double-chambered tire combination comprising a tire casing, an inner liner mounted within the casing, and a valve insert, said valve insert comprising a cylindrical flexible portion extending through said casing and said inner liner, a central opening extending longitudinally through said flexible portion, a transverse opening extending through said flexible portion between the casing and the inner liner and fluidly connected to said central opening and said central opening held shut by the casing and the liner.

2. A double-chambered tire combination comprising a tire casing, an inner liner mounted within the casing, and a valve insert, said valve insert comprising a cylindrical flexible portion extending through the casing, means for preventing longitudinal motion of the valve insert relative to the casing, means for preventing longitudinal motion of the valve insert relative to the inner liner, a central opening formed longitudinally through the valve insert and normally held closed by the casing and the inner liner and a transverse opening formed through the valve insert between the casing and the liner and in communication with the central opening.

3. Apparatus according to claim 2 wherein the valve insert is reduced in cross-section between the casing and the inner liner to allow relative motion between the casing and the inner liner.

4. A double-chambered tire combination comprising a tire casing, an inner liner mounted within the casing, and a valve insert, said valve insert comprising a cylindrical flexible portion extending through the tire casing and the inner liner and held so as to prevent longitudinal motion relative thereto, a longitudinal opening formed through the body portion and said opening held closed by the tire casing and the inner liner, a transverse opening formed through the body portion between the tire casing and the inner liner and communicating with the longitudinal opening and said longitudinal opening extending through the wall of the body portion within the inner liner.

5. A double-chambered tire combination comprising a tire casing, an inner liner mounted within the casing, and a valve insert, said valve insert comprising a cylindrical flexible portion extending through the casing and the inner liner, said body portion having a flexible pervious portion extending between the casing and the liner, and openings formed through the portions of the valve insert which extend through the casing and the inner liner.

6. A rubber valve for a pneumatic tire having two concentric individually sealed chambers, comprising a rubber valve insert extending from the interior of the tire to the exterior thereof and having a passage extending longitudinally thereof, a transverse port extending through the valve insert intermediate its ends and fluidly connected to the longitudinal passage, and adapted to allow fluid to be inserted into the outer chamber of the tire, the inner end of the valve insert terminating within the inner chamber of the tire to allow fluid to be inserted into the inner chamber, and an inflating needle receivable in said valve insert and formed with a pair of openings to inflate the inner and outer chambers of the tire.

7. A double-chambered tire combination comprising a tire casing, an inner liner mounted within the casing, and a valve insert, said valve insert comprising a cylindrical flexible portion and a longitudinal opening formed therethrough, a first pair of shoulders attached to the cylindrical flexible portion and engageable with the inside and outside of the tire casing, a second pair of shoulders attached to the flexible portion and engageable with the inside and outside of the inner liner, and a transverse opening formed through the body portion between the first and second pairs of shoulders and in communication with the longitudinal opening.

References Cited in the file of this patent
UNITED STATES PATENTS

| | | |
|---|---|---|
| 1,672,905 | Riddell | June 12, 1928 |
| 2,026,933 | De Laney | Jan. 7, 1936 |
| 2,136,929 | Adams | Nov. 15, 1938 |
| 2,248,739 | Benson et al. | July 8, 1941 |
| 2,400,969 | Baker | May 28, 1946 |
| 2,513,817 | Pennington | July 4, 1950 |
| 2,540,403 | Meyers | Feb. 6, 1951 |
| 2,549,075 | Fox | Apr. 17, 1951 |
| 2,634,785 | Tubbs | Apr. 14, 1953 |
| 2,754,875 | King et al. | July 17, 1956 |